United States Patent [19]

Vora et al.

[11] Patent Number: 4,877,653
[45] Date of Patent: Oct. 31, 1989

[54] PROCESS FOR INSOLUBLIZING SOLVENT SOLUBLE POLYIMIDE COMPOSITIONS

[75] Inventors: Rohitkumar H. Vora; Dinesh N. Khanna, both of West Warwick; Suzanne Fontaine, Warwick, all of R.I.

[73] Assignee: Hoechst Celanese Corporation, Somerville, N.J.

[21] Appl. No.: 217,796

[22] Filed: Jul. 12, 1988

[51] Int. Cl.$^4$ ................................................ B05D 3/02
[52] U.S. Cl. ............................ 427/385.5; 264/331.19; 428/473.5; 528/352; 528/353
[58] Field of Search ................ 427/385.5; 428/473.5; 264/331.19; 528/352, 353

[56] References Cited

U.S. PATENT DOCUMENTS 3,356,648 12/1967 Rogers ............................ 528/352 X
4,690,999 9/1987 Numata et al. ...................... 528/188

Primary Examiner—Michael Lusignan
Attorney, Agent, or Firm—Perman & Green

[57] ABSTRACT

A method of insolubilizing solvent soluble polyimides comprising the imidized condensation products of an aromatic dianhydride and a primary aromatic diamine wherein at least one of said dianhydride or diamine is selected from the group consisting of 2,2-hexafluoro-bis(3,4-dicarboxyphenyl)propane dianhydride; 2,2-hexafluoro-bis(3-aminophenyl) propane; 2,2-hexafluoro-bis(4-aminophenyl)propane; 2,2-hexafluoro-bis-[4-(3-aminophenoxy)phenyl]propane; 2,2-hexafluoro-bis[4-(4-aminophenoxy)phenyl]propane; 1,1-bis(4-aminophenyl)-1-phenyl-2,2,2-trifluoroethane; 1,1-bis-[4-(1,2-dicarboxyphenyl)]-1-phenyl-2,2,2-trifluoroethane dianhydride and mixtures thereof.

The method comprises forming a shaped article or film comprising the polyimides and subjecting same to a heat annealing process at a temperature of at least 325° C. and for a period of time sufficient to insolubilize the polyimide. Preferred temperatures range from 350° C. to 400° C. for a period of time of at least 45 minutes to about 2 hours.

10 Claims, No Drawings

PROCESS FOR INSOLUBLIZING SOLVENT SOLUBLE POLYIMIDE COMPOSITIONS

BACKGROUND OF THE INVENTION

The present invention relates to organic solvent soluble aromatic polyimides containing the hexafluoroisopropylidine or trifluoroethylidene linking group and to a method for rendering such polyimides substantially insoluble in organic solvents.

Polyimide condensation products of 2,2-bis (4-aminophenyl)hexafluoropropane and aromatic dianhydrides are described in U.S. Pat. No. 3,356,648. These polyimides may be produced by first preparing a polyamic acid by reacting the diamine and a suitable dianhydride such as pyromellitic dianhydride in a solvent for at least one of the reactants to produce the polyamic acid followed by conversion of the polyamic acid to the polyimide. For the preparation of films, the polyamic acid solution is applied to a substrate and heated at temperature of up to about 300° C. for a period of several hours to imidize the polyamic acid. Such films exhibit high tensile properties, high thermooxidative stability and low dielectric properties which render them extremely useful as printed circuit backings, insulating layers for wire and cable assemblies, protective layers for solar cells and like applications. Such polyimides are also suitable in the fabrication of reinforced composites, molded parts, fibers and the like.

Many polyimides containing the hexafluoroisopropylidene linkage derived from aromatic diamines and aromatic dianhydrides (with the exception of pyromellitic dianhydride) are soluble at room temperature in many organic solvents such as chlorinated solvent, n-methyl-pyrrolidone, acetone, methyl ethyl ketone, diglyme, gamma-butyrolactone, propylene glycol methyl ester and like materials. This property of solubility permits the direct application of solutions of the finished polyimide to a substrate by spin coating, spray coating and brush coating methods. It is most advantageous for the fabricator to form a coating or laminate using the finished polyimide rather than the intermediate polyamic acid solution because the polyamic acid solutions have poor storage stability and require refrigeration, and also because the evolution of volatiles such as water during the in-situ heat imidization step can lead to non-uniformity of the surface and cross section of the film or article.

However the advantage of solubility can be a detriment in certain applications where the surface of the polyimide must be cleaned or otherwise treated with organic solvents after application to a substrate, or where composites and shaped articles come into contact with solvents or fuels. For example, polyimides are commonly used in flexible printed circuitry applications wherein the film is laminated to a backing such as copper, then coated with a photoresist, exposed and etched. Often times the polyimide surface must first be cleaned with organic solvents to remove dust and other impurities prior to the application of the resists, such as disclosed in U.S. Pat. No. 3,833,436. Such a treatment can result in a cracking or partial dissolution of the soluble polyimide which will detract from the effectiveness of the polyimide as an insulating or dielectric layer. In addition, composite articles or shaped parts used in the aircraft industry (fuel tank liners, for example) must be inert to solvents used in their cleaning and to fuels with which they may come in contact.

Accordingly, it is an object of this invention to provide a method for rendering coatings, films composites and other articles based on solvent soluble polyimides insoluble after application to a substrate surface or after shaping.

It is also an object of this invention to improve the adhesion of polyimide films to substrates such as metals and silicon wafers.

SUMMARY OF THE INVENTION

These and other objects of the invention may be achieved by subjecting films, composites and shaped articles prepared using the solvent soluble polyimides of the present invention to a heat annealing process at a temperature in excess of about 325° C. and for a period of time sufficient to effect a thermal curing and insolubilization of the polyimide. The exact chemical mechanism of the thermal curing is not understood but it it believed that either an oxidative cross linking occurs or intermolecular ring closings of residual polyamic acid present as trace amounts in the polyimide takes place. In any event, the heat annealing process renders essentially insoluble in organic solvents at room temperature and at temperatures of up to about 70° C. those polyimides which were soluble in such solvents prior to being subjected to the heat treatment. The process also improves the adhesion of the polyimides to substrate surfaces.

DESCRIPTION OF THE PREFERRED EMBODIMENTS

The solvent soluble polyimides which may be used in the present invention are the imidized condensation products of an aromatic dianhydride and a primary aromatic diamine wherein at least one of said dianhydride or diamine is selected from the group consisting of 2,2-hexafluoro-bis(3,4-dicarboxyphenyl)-propane dianhydride; 2,2-hexafluoro-bis(3-aminophenyl)propane; 2,2-hexafluoro-bis-(4-aminophenyl)propane; 2,2-hexafluoro-bis-[4-(3-aminophenoxy)phenyl]propane; 2,2-hexafluoro-bis[4-(4-aminophenoxy)phenyl]propane; 1,1-bis(4-aminophenyl)-1-phenyl-2,2,2-trifluoroethane; 1,1-bis-[4-(1,2-dicarboxyphenyl)]-1-phenyl-2,2,2-trifluoroethane dianhydride and mixtures thereof.

The preparation of dianhydrides and diamines useful in the preparation of the solvent soluble polyimide component of the invention are known in the art; see e.g., U.S. Pat. No. 3,310,573, Veber, W. B.; Gupta, M. R., Recent Advances in Polyimide Science and Technology, Second International Conference on Polyimides; Chemistry, Characterization and Applications; Society of Plastics Engineers Inc., Poughkeepsie, N.Y. (1986) and Lau et al, Journal of Poly. Science, Poly. Chem, Ed., Vol. 20, p. 2381-2393 (1982). The preparation of the solvent soluble polyimides of the invention is also known, as disclosed in U.S. Pat. No. 3,356,648 and U.S. Pat. No. 3,959,350.

The solvent soluble polyimides useful in the preparation of the compositions of the invention may be represented by the following general formulae:

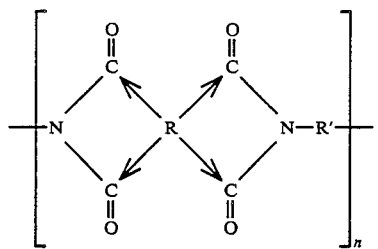

wherein R is a tetravalent aromatic moiety, the bond sign → denotes isomerism, R' is a divalent aromatic moiety and n is a number sufficient to provide an inherent viscosity of at least 0.2 as measured from a solution of the polymer in dimethylacetamide at 25° C. at a polymer concentration of 0.5 weight percent. In order to achieve the desired solubility, thermal stability, electrical insulating and mechanical properties at least one of the moieties R or R' or both is selected respectively from a tetravalent or divalent moiety of the formula:

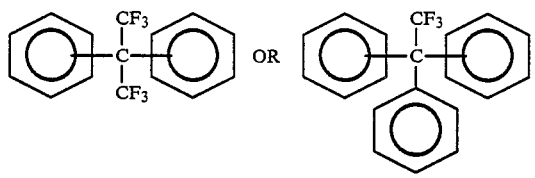

Illustrative diamine comonomers for the above dianhydrides are:
m-phenylene diamine;
p-phenylene diamine;
4,4'diaminodiphenyl ether;
3,3'-diaminodiphenyl ether;
3,4'-diaminodiphenyl ether;
1,3-bis-(aminophenoxy)benzene;
1,4-bis(aminophenoxy)benzene; benzidine;
3,3'-dimethyl benzidine;
3,3'-dichloro benzidine;
3,3'-dimethoxy benzidine;
3,3'-dibutoxy benzidine;
3,3'-diaminodiphenyl methane;
4,4'-diaminodiphenyl methane;
4,4'-diaminodiphenyl propane;
3,3'-diaminodiphenyl sulfone;
4,4'-diaminodiphenyl sulfone;
4,4-diaminodiphenyl sulfide; alpha, alpha$^1$-bis(aminophenyl)p-diisopropylbenzene;
1,3-bis[4(4-aminophenoxy)-alpha, alpha$^1$-bistrifluoromethyl]benzene;
2,2-bis(4-aminophenyl)propane;
m-xylylenediamine;
p-xylylendeiamine;
4,4'-bis(p-aminophenoxy)diphenyl sulfide;
4,4'-bis(3"aminophenoxy)diphenyl sulfide;
4,4'(3"-aminophenoxy)-(4',-aminophenoxy)-diphenyl sulfide;
4,4'-bis(p-aminophenoxy)diphenyl sulfone;
4,4'-bis-(3"-aminophenyl) sulfone;
2,2-bis[4'-p-aminophenoxy)phenyl]propane;
2,2-bis-[3'p-aminophenoxy)phenyl]propane;
1,1-bis-[4'(p-aminophenoxy)phenyl]ethyl benzene; and mixtures thereof.
Preferred diamines are:
para-phenylene diamine;
meta-phenylene diamine;
2,2-bis[4-(4-aminophenoxy)phenyl]hexafluoropropane;
3,4'-diaminodiphenyl ether;
4,4'-diaminodiphenyl ether;
2,2-hexafluoro-bis(3-aminophenyl)propane;
2,2-hexafluoro-bis(4-aminophenyl)propane;
1,1-bis(4-aminophenyl)-1-phenyl-2,2,2-trifluoroethane; and mixtures thereof.

Illustrative dianhydride comonomers are:
2,3,6,7-naphthalene tetracarboxylic dianhydride;
3,3'4,4'-diphenyl tetracarboxylic dianhydride;
1,2,5,6-naphthalene tetracarboylic dianhydride;
2,2',3,3'-diphenyl tetracarboxylic dianhydride;
2,2-bis(3,4-dicarboxyphenyl)propane dianhydride;
bis(3,4-dicarboxyphenyl)sulfone dianhydride;
3,4,3,10-perylene tetracarboxylic acid dianhydride;
bis(3,4-dicarboxyphenyl)ether dianhydride;
2,2-bis(2,3-dicarboxyphenyl)propane dianhydride;
1,1-bis(2,3-dicarboxyphenyl)ethane dianhydride;
bis(3,4-dicarboxyphenyl)methane dianhydriude;
bis(2,3-dicarboxyphenyl)sulfone dianhydride;
benzophenone tetracarboxylic dianhydride; and mixtures thereof.
Preferred dianhydrides are:
2,2-hexafluoro-bis(3,4-dicarboxyphenyl) propane dianhydride;
1,1-bis[4-(1,2-dicarboxyphenyl)]-1-phenyl-2,2,2-trifluoroethane dianhydride;
3,3',4,4'-diphenyl tetracarboxylic dianhydride;
3,3',4,4'-benzophenone tetracarboxylic dianhydride, and
bis(3,4-dicarboxyphenyl)ether dianhydride.

Polyimides prepared from the above mentioned comonomers are more completely described in copending application Ser. No. 124,742, filed in the USPTO on Nov. 24, 1987, now U.S. Pat. No. 4,803,147, patented Feb. 7, 1989, the disclosure of which is incorporated herein by reference.

The most preferred polyimides for the purposes of this invention are those prepared by the imidization of the polyamic acid reaction products of 2,2-bis(4-amino phenyl)hexafluoropropane with one or more of:
2,2-hexafluoro-bis(3,4-dicarboxyphenyl) propane dianhydride;
1,1-bis[4-(1,2-dicarboxyphenyl)]-1-phenyl-2,2,2-trifluoroethane dianhydride;
3,3',4,4'-diphenyl tetracarboxylic dianhydride;
3,3',4,4'-benzophenone tetracarboxylic dianhydride; or
bis(3,4-dicarboxyphenyl)ether dianhydride.

As indicated above, the solvent soluble polyimides of the present invention may be rendered insoluble by subjecting shaped or fabricated articles containing the polymer to a thermal annealing process at a temperature of at least 325° C. and for a period of time sufficient to insolubilize the polymer. The exact amount of time required to achieve insolubilization depends upon the particular polyimide, but generally ranges from at least about 45 minutes for polyimides treated at temperatures of 400° C. or more, and at least about 90 minutes for polyimides treated at temperatures of 325° to 350° C. Temperatures may range from about 325° to about 500° C. In most cases insolubility is achieved by subjecting the polyimide to a temperature of about 350° C. for a period of about 120 minutes.

The polyimides useful in the present invention, either alone or in combination with other materials, are shaped into useful articles by molding, extrusion, spinning, solution casting and other known processes prior to subjecting the material to the heat annealing process of the invention. In the case of films employed in electrical or electronic applications, a solution of the polyimide may be spun coated onto a suitable substrate such as a silicon wafer, and then the coated article is subjected to a gradual heating cycle up to a temperature of about 300° to 350° C. to remove the solvents.

Other applications of the polyimides include other shaped articles such as molded parts, high temperature insulators, transparent fuel filter assemblies, seals, gaskets, thrustwashers, pipes of high thermal stability and corrosion resistance, high temperature and inert insulating, passivation and protective films, high strength-heat resistant fibers in tire cords, flame resistant clothing, ballistic protection vests, composite articles with other organic and/or inorganic fillers and fibers or in open fiber mats, as the impregnating material in laminates and in other application obvious to the skilled artisan. Advantageously fillers such as glass fibers, silica. molybdenum, graphite, and PTFE may be compounded or blended with the above specified polyimides to form molding and extrusion compositions.

In the preparation of laminates, a laminating varnish may be prepared by dissolving the above specified polyimides in a suitable solvent such as N-methylpyrrolidone, diglyme, dimethylformamide, propylene gylcol methyl ether, etc. The polyimide solution is then applied to a suitable reinforcing fabric such as a boron fiber fabric, a quartz fiber fabric, graphite or glass fabric and the solvent removed and a fused shaped part is formed using vacuum bag or autoclave laminating procedures. Similarly, these polyimides may be processed into fibers by melt or solution techniques and knitted or braided into a fabric or structural form which is then laminated with a reinforcing fabric of glass, boron, quartz or graphite, optionally with a laminating varnish, under heat and pressure. Similarly, glass, quartz, boron and graphite fibers may be mixed with a solution of these polyimides, the solvent removed by heat and optionally reduced pressure and the mixture fused into an article of the desired shape by the use of heat and pressure.

The following examples are illustrative of the invention.

EXAMPLE 1

The polyimide condensation product of 2,2-bis(4-aminophenyl)hexafluoropropane and 2,2-bis(3,4-dicaboxyphenyl)hexafluoropropane tetracarboxylic dianhydride (6FDA) was prepared as follows:

A 3-liter, 3-neck flask equipped with a condenser, thermometer, stirrer and nitrogen purge blanket, was charged with 96.86 gms (0.29 moles) of electronic grade 2,2-(bis(4-aminophenyl)hexafluoro propane (Mol. wt. 334) and 510 gms. of distilled N-methylpyrrolidone solvent under nitrogen atmosphere. The mixture was stirred to obtain a clear solution and to the solution were added 128.76 gms (0.29 moles) of electronic grade 2,2-bis(3,4-dicarboxyphenyl)-hexafluoropropane tetracarboxylic dianhydride (Mol. wt. 444). After adding 392 gms of solvent, the reaction mixture is stirred overnight at room temperature. The resulting viscous polyamic acid has inherent viscosity of 0.73 dl/gm measured at 0.5 gm/dl at 25° C. in dimethyl acetamide (DMAC). To the 1125 gms of polyamic acid solution 290 gms of acetic anhydride and 29 gms of beta-picoline is added to convert the polyamic acid to the polyimide and the resulting polyimide is precipitated in methanol and is isolated by filtration, washed with fresh methanol and dried.

The resulting polyimide was dissolved in a solvent mixture of bulyrolactone and diglyme to form a 15% by weight solution, and spun coated onto the surface of a number of silicon wafers using techniques more fully described below. The coated wafers were then placed into a circulating hot air oven and subjected to a heating cycle of 90° C. for 15 minutes, 220° C. for 30 minutes and 350° C. for 30 minutes to drive off the solvent. After cooling, one wafer was soaked in methyl ethyl ketone solvent for 30 minutes at room temperature. The polyimide coating was found to have completely dissolved after 30 minutes.

Other wafers dried as set forth above were then subjected to the heat annealing process of the present invention. The wafers were placed in a circulating hot air oven maintained at a temperature of 350°. Sample wafers were removed from the oven at one half hour intervals and the solubility of the coated polyimide in methyl ethyl ketone at room temperature was evaluated as described above. The polyimide coated on wafers removed after one half hour was 16.2% soluble, after 1 hour: 7.7% soluble, after one and one half hours: 4.0% soluble, and after 2 hours: insoluble.

The polymerization procedure of Example 1 was used to prepare the polyimides of the following electronic grade aromatic diamines and dianhydrides:

EXAMPLE 2

2,2-hexafluoro-bis(4-aminophenyl)propane and 3,3',4,4'-benzophenone tetracarboxylic dianhydride (BTDA);

EXAMPLE 3

2,2-hexafluoro-bis(4-aminophenyl)propane and 3,3',4,4'-diphenyl tetracarboxylic dianhydride (BPDA)

EXAMPLE 4

2,2-hexafluoro-bis(4-aminophenyl)propane and bis(3,4-dicarboxyphenyl)ether dianhydride (ODPA)

EXAMPLE 5

The polymerization procedure of Example 1 was repeated using 2,2-hexafluoro-bis(3-aminophenyl)propane as the diamine and 6 FDA as the dianhydride.

EXAMPLE 6

The polymerization procedure of Example 1 was repeated using 3,3'dimethylbenzidine as the diamine and 6 FDA as the dianhydride.

Fully imidized polyimides as prepared above are soluble in common solvents such as acetone, dimethylacetamide, N-methylpyrrolidone, diglyme,. methyl ethyl ketone, tetrahydrofuran, chloroform., butyrolactone, dimethylformamide, propylene glycol methyl ether, propylene glycol methyl ether acetate as well as mixtures of such solvents.

The polymers of Examples 1-6 were dissolved in a solvent mixture consisting of 50% by weight butyrolactone and 50% by weight propylene glycol methyl ether acetate at a concentration of 15% by weight solids. Each polymer solution was then applied to 2 inch fully cleaned and dried silicon wafers using a standard spin coating technique. Each coating was dispersed at the center of the wafer at rest so that 30% of the surface area was covered in order to maintain constant the amount of material applied to each wafer. Each wafer was then spun at a speed within the range of about 2000 to 3000 RPM for 30 seconds. The coated wafers were then placed in a circulating air over and subjected to a heating cycle of 90° C. for 15 minutes, 160° C. for 15 minutes, 250° C. for 15 minutes and 350° C. for 30 minutes. This heating step removed essentially all of the solvent and provided a more uniform coating on the surface of the wafer.

The thickness of the resulting coatings ranged in the order of about 4 to 8 microns.

Prior to subjecting the wafers to the heat annealing process described below, it was observed that the polyimide coatings could be readily peeled away from the surface of the wafer.

To achieve insolubilization, the coated wafers were then subjected to the heat annealing process of this invention by heating at 350° C. for a period of 120 minutes. The annealed wafers were then slowly cooled to room temperature.

Two wafers each having the coatings of polyimide of Examples 1-6 were soaked in methyl ethyl ketone solvent for a period of 30 minutes. In one case the solvent was maintained at room temperature and in the other case the solvent was maintained at 70° C. The wafers were then dried to remove residual solvent. Percent weight loss was determined by comparing the dry weight of each wafer before and after exposure to the solvent. Results are reported in Table 1.

TABLE 1

| Polyimide | Percent Weight Loss | |
|---|---|---|
| | Mek/R.T./30 min. | Mek/70° C./30 min. |
| EX. 1 | No Loss | 0.4 |
| EX. 2 | 0.9 | 0.9 |
| EX. 3 | No Loss | 0.5 |
| EX. 4 | No Loss | No Loss |
| EX. 5 | 10.0 | 10.0 |
| EX. 6 | No Loss | No Loss |

The data in Table 1 demonstrate the complete insolubilization of the polyimides of Examples 4 and 6 under all test conditions and those of Examples 1 and 3 at room temperature test conditions. Weight loss results of less than about 2% reflect the fact that the polymers have been essentially insolubilized.

EXAMPLE 7

In a manner specified above, two additional wafers were prepared and spin coated with a solution of the polyimide of Example 5. After removing the solvent as specified above, the wafers were subjected to the heat annealing process of this invention, but in this instance at a temperature of 400° C. for 60 minutes. The cured wafers were then soaked in MEK solvent for 30 minutes at room temperature and at 70° C. as set forth above. Percent weight loss determinations showed no weight loss at both the room temperature and 70° C. test conditions.

It was also observed that the insolubilized polyimides in all cases could not be peeled off the surface of the wafers after undergoing the heat annealing process described above. Thus the adhesion to substrates is markedly enhanced.

EXAMPLE 8

The polyimide of Example 1 was dissolved in a 50/50 mixture of butyrolactone and tetrahydrofuran at a solids level of 20% by weight. The solution was coated onto a sheet of polyester using a draw down rod. The coated sheet was placed in a circulating oven at room temperature and heated to a temperature of 150° C. to drive off the solvent. The dried polyimide film was then peeled from the polyester backing. The film had a thickness of 40 microns.

Four samples of the film were then cut and subjected to heat treatments at the temperatures and times specified in Table 2 and soaked in MEK at room temperature for the times set forth in Table 2.

TABLE 2

| Final Heat Treatment | | MEK Exposure | Results |
|---|---|---|---|
| °C. | Time (Min) | Time (Min) | Weight Loss |
| 150° | 10 | 30 | Dissolved |
| 200° | 120 | 30 | Dissolved |
| 350° | 120 | 30 | No Loss |
| 400° | 60 | 120 | No Loss |

These test results demonstrate that polyimides subjected to the heat annealing process of this invention are completely insolubilized when treated within the parameters set forth herein.

This invention has been described by way of the above specification and illustrative examples and it is to be understood that this invention is not limited to the specific embodiments thereof except as defined by the following claims.

What is claimed is:

1. A process for insolubilizing a composition comprising a solvent soluble polyimide comprising:
   (a) forming said composition into a shaped article;
   (b) subjecting said composition to a heat annealing process at a temperature of at least about 325° C., and for a period of time sufficient to insolubilize said polyimide composition;
   said soluble polyimide being the condensation and imidization product of an aromatic diamine and an aromatic dianhydride, wherein at least one of said dianhydride or said diamine is selected from the group consisting of 2,2-hexafluoro-bis-(3,4-dicarboxyphenyl) propane dianhydride; 2,2-hexafluoro-bis (3-aminophenyl)propane;
   2,2-hexafluoro-bis(4-aminophenyl) propane;
   2,2-hexafluoro-bis[4-(3-aminophenoxy) phenyl]-propane;
   2,2-hexafluoro-bis[4-(4-aminophenoxy) phenyl]-propane;
   1,1-bis(4-aminophenyl)-1-phenyl-2, 2,2-trifluoroethane;
   1,1-bis-[4-(1,2-dicarboxyphenyl)]-1-phenyl-2,2,2-trifluoroethane dianhydride;
   and mixtures thereof.

2. The process of claim 1 wherein said heat annealing process is conducted for a period of time of at least about 90 minutes.

3. The process of claim 2 wherein said heat annealing process is conducted for a period of time of about 120 minutes at a temperature of about 350° C.

4. The process of claim 1 wherein said heat annealing process is conducted for a period of time of at least about 45 minutes at a temperature of at least about 400° C.

5. The process of claim 1 wherein said shaped article is prepared by forming a solution of said solvent soluble polyimide in organic solvent, applying said solution to a substrate, and evaporating off said organic solvent.

6. The process of claim 5 wherein said shaped article is a film.

7. The process of claim 6 wherein said heat annealing process is conducted at a temperature of about 350° C. for a period of time of at least about 90 minutes.

8. The process of claim 1 wherein said diamine is 2,2-hexafluoro-bis(4-aminophenyl)propane and said dianhydride is selected from 3,3',4,4'-benezophenone tetracarboxylic dianhydride; bis(3,4-dicarboxyphenyl)ether tetracarboxylic dianhydride; 3,3',4,4'-diphenyl tetracarboxylic dianhydride; 2,2-bis(3,4-dicarboxyphenyl)-hexafluoropropane tetracarboxylic dianhydride; and mixtures thereof.

9. The process of claim 5 wherein said substrate is a silicon wafer.

10. A shaped article comprising a cured insolubilized polyimide composition prepared by the process of claim 1.

* * * * *